United States Patent [19]

Duggal et al.

[11] Patent Number: 5,169,119

[45] Date of Patent: Dec. 8, 1992

[54] MECHANISM FOR RELEASING STORED GAS FROM A PRESSURE VESSEL

[75] Inventors: Virinder Duggal; Rashmi Duggal, both of Woodinville, Wash.

[73] Assignee: The Boeing Company, Seattle, Wash.

[21] Appl. No.: 666,382

[22] Filed: Mar. 8, 1991

[51] Int. Cl.[5] .................................... F16K 31/524
[52] U.S. Cl. ........................................ 251/74; 222/3
[58] Field of Search ................ 222/3, 5; 244/905; 441/92, 94, 96, 41; 251/74, 294

[56] References Cited

U.S. PATENT DOCUMENTS

| 2,041,662 | 5/1936 | Mapes. | |
|---|---|---|---|
| 2,675,144 | 4/1954 | Elikann | 222/5 |
| 2,946,484 | 7/1960 | Stoner | 222/5 |
| 3,630,413 | 12/1971 | Beckes et al. | 222/5 |
| 3,702,623 | 11/1972 | Chacko | 244/905 X |
| 3,709,044 | 1/1973 | Chacko | 251/74 X |
| 3,782,413 | 1/1974 | Chacko | 251/74 X |
| 4,191,310 | 3/1980 | Bernhardt et al. | 222/5 |
| 4,269,386 | 5/1981 | Crowe | 441/96 X |
| 4,927,057 | 5/1990 | Janko et al. | 222/5 |
| 4,946,067 | 8/1990 | Kelsall | 222/5 |
| 5,009,249 | 4/1991 | Fisher et al. | 222/3 X |

Primary Examiner—Kevin P. Shaver
Attorney, Agent, or Firm—Delbert J. Barnard

[57] ABSTRACT

In a mechanism designed to release a stored gas from a storage bottle. A reciprocating valve plug is held in a retracted position by a cocking arm which is in turn held in position by a lock lever which is in a lock position. A firing lanyard has an end portion connected to the lock lever such that when the firing lanyard is pulled the lock lever pivots out of contact with the cocking arm. The lock lever is urged into its lock position by a torsion spring. Once the lock lever is moved to its release position, the cocking arm is immediately urged to its release position by a torsion spring acting thereon. The cocking arm torsion spring is stronger than the lock lever torsion spring thereby enabling the cocking arm to hold itself and the lock lever in their respective release positions. Once the cocking arm has moved to its release position the valve plug is free to be moved upwardly by its respective compression spring, thereby releasing the pressure within the storage bottle for inflation of an escape slide as used aboard aircraft.

3 Claims, 4 Drawing Sheets

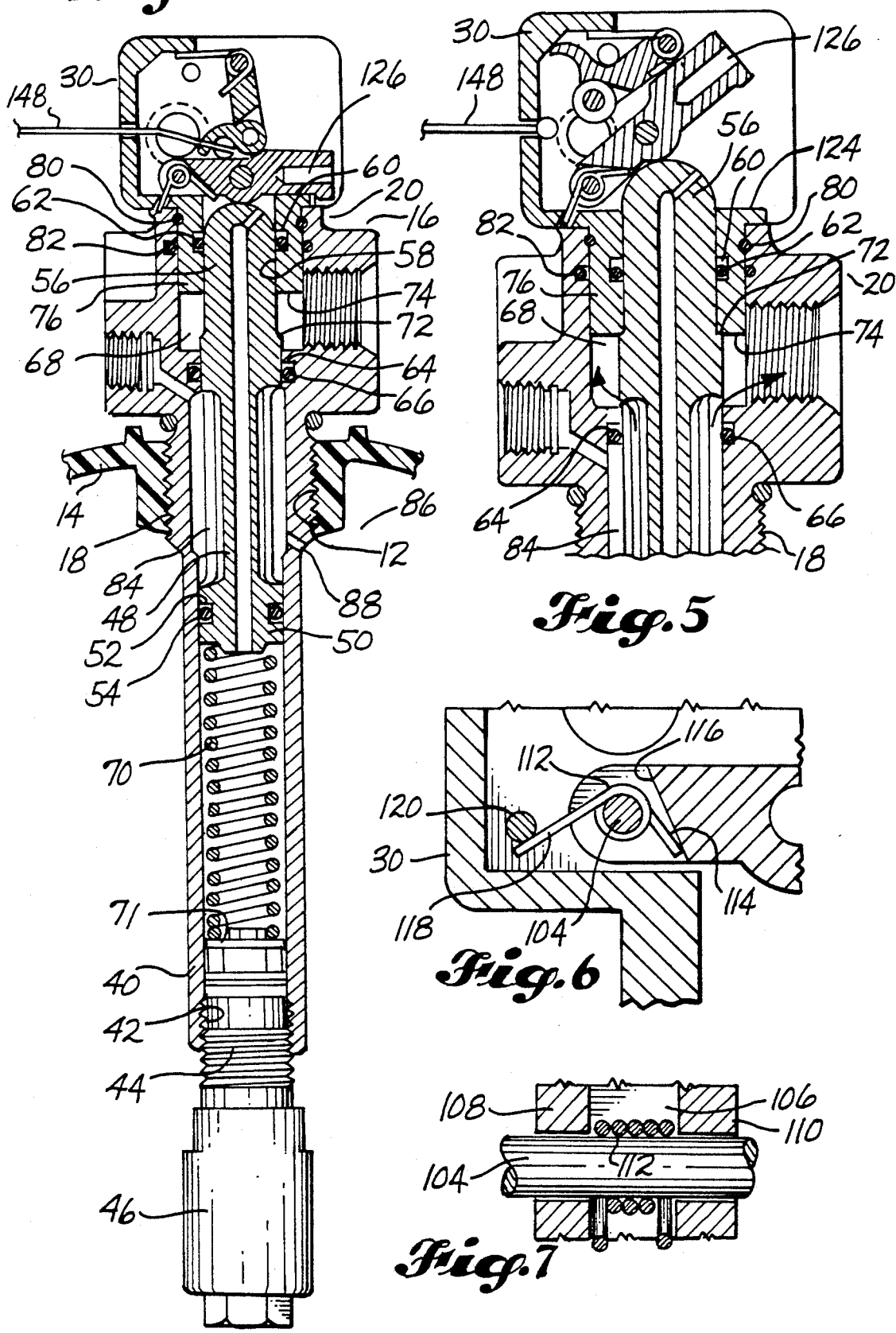

MECHANISM FOR RELEASING STORED GAS FROM A PRESSURE VESSEL

TECHNICAL FIELD

This invention relates to the provision of an improved mechanism for releasing stored gas from a pressure vessel in response to a pull on a release cord.

BACKGROUND INFORMATION

Aircraft escape slides, slide/rafts, rafts and other inflatables, are inflated by use of a gas released from a pressure bottle. The pressure bottle is equipped with an outlet fitting which includes a valve for controlling release of the gas from the bottle. One type of valve includes a valve plug having a retracted, valve-closing position, and an extended, valve-opening position. A spring acts on the valve plug and biases it endwise outwardly towards its extended position. When the valve plug is in its extended position, pressure gas is released from the bottle out through the fitting and into the inflatable. The fitting includes a releasable lock mechanism which contacts the outer end of the valve plug when the valve plug is in its retracted position and prevents the spring from extending the valve plug. This lock mechanism, until released, physically blocks movement of the valve plug from its retracted position out to its extended position.

One known type of releasable lock mechanism includes an elongated cocking arm that is pivotally connected at one of its ends to the fitting, for pivotal movement between a down position and an up position. When the cocking arm is in its down position, it extends laterally of the valve plug, in physical contact with the outer end of the valve plug. This mechanism also includes an elongated look lever which is pivotally connected at one end for pivot movement between a lock position and a release position. The lock lever includes a second end which is in physical contact with the cocking arm when the lock lever is in its lock position. The contact of the locking lever with the cocking lever prevents the cocking lever from moving upwardly from its down position. The lock lever is moved from its lock position to its release position by use of a release cord which is connected to the lock lever, near its second end. When it is desired to release inflation gas from the pressure bottle, a sharp pull is exerted on the release cord, to move the lock lever from its lock position to its release position. When the lock lever is in its release position, it is out of the path traveled by the cocking arm when the cocking arm moves from its down position to its up position. In the past, the biasing spring acting on the valve plug has been relied upon to move the cocking arm from its down position to its up position. The cocking arm is not spring biased but rather is gravity biased towards its down position. The force of gravity acting on the cocking arm maintains the cocking arm in its down position until it is moved upwardly by an extension of the valve plug. The pull on the release cord is a one shot operation. This is because the connection between the release cord and the lock lever is of a type which allows the release cord to separate from the lock lever at the end of the swing path of the lock lever. In such known release mechanism, the lock lever is spring biased towards its lock position. If the valve plug does not extend immediately, the spring acting on the lock lever can swing the lock lever back into its lock position against the cocking arm before the valve plug moves. It then becomes difficult and time consuming to operate the release mechanism.

It is an object of the present invention to prevent a relocking of the lock mechanism, and instead assure that there will always be a release of the mechanism, and in turn a release of inflation gas from the pressure vessel, in response to the pull on the release cord.

DISCLOSURE OF THE INVENTION

Stored gas release mechanisms constructed according to the present invention include a reciprocating valve plug which is movable between a retracted position and an extended position. A spring acts on the valve plug to bias it endwise outwardly towards its extended position. A cocking arm is positioned at the outer end of the valve plug. The cocking arm is movable against the outer end of the valve plug, from an up position to a down position, for moving the valve plug from its extended position into its retracted position. A lock lever is movable between a lock position and a release position when the lock lever is in its lock position it contacts the cocking arm while the cocking arm is in contact with the outer end of the valve plug and the valve plug is in its retracted position. In operation, the lock lever is moved from its lock position into its release position. When the lock lever is in its release position it is spaced from the down position of the cocking arm, freeing the cocking arm to move up from its down position. This release of the cocking arm allows the spring that acts on the valve plug to move the valve plug endwise outwardly from its retracted position into its extended position.

According to the invention, a separate spring is connected to the cocking arm and is positioned to bias the cocking arm away from its down position. The spring functions to immediately move the cocking arm from its down position to its up position in response to the release movement of the lock lever from its lock position to its release position. The spring also functions to hold the cocking arm in its up position and to also hold the locking lever in its release position. This is done to prevent movement of the lock lever back into its lock position before the compression spring operates to extend the valve plug from its retracted position into its extended position.

In preferred form, the release mechanism includes a support structure for the lock lever and the cocking arm. A pivot pin connects an end portion of the cocking arm to the support structure, for pivotal movement of the cocking arm about the pivot pin. The spring that is connected to the cocking arm is a torsion spring having a helical portion surrounding the pivot pin. A first end portion of the spring is anchored to the support structure. A second end portion of the spring is in contact with the cocking arm. Movement of the cocking arm from its up position to its down position stores energy in the torsion spring.

The lock lever includes a spring that is positioned to bias the lock lever towards its lock position. In preferred form, the spring that is connected to the cocking arm is stronger than the spring that is connected to the lock lever, so that it overrides the spring connected to the lock lever. As a result, the spring connected to the cocking arm holds the cocking arm in its up position and in addition holds the lock lever in its release position.

In preferred form, the support structure for the lock lever and the cocking arm is positioned axially outwardly of a tubular chamber in which the valve plug is housed. The tubular chamber has an outer end against which the cocking arm rests when the cocking arm is in its down position, against the valve plug, and the valve plug is retracted, and the locking lever is in its lock position. According to an aspect of the invention, the cocking arm includes a lateral protuberance positioned to extend axially downwardly into the valve plug chamber when the cocking arm is against the outer end of the tubular chamber. The protuberance on the cocking arm contacts the outer end of the valve plug and functions to move the valve plug an additional amount endwise against its spring, so as to increase the stored energy in the spring available for moving the valve plug from its retracted position into its extended position.

Other aspects, objects, features and advantages of the invention are hereinafter described in the description of the best mode of the invention.

BRIEF DESCRIPTION OF THE DRAWINGS

In the drawings, like reference numerals designate like parts throughout the several views, and:

FIG. 4 is an axial sectional view of the outlet fitting and an upper end portion of the pressure vessel, with some parts shown in elevation, such view showing the valve plug in its retracted position and the cocking arm and lock lever positioned to hold it in its retracted position;

FIG. 5 is an enlarged scale view of the upper portion of FIG. 4, showing the cocking arm spring holding the cocking arm in its up position and the lock lever in its release position, and further showing the valve plug in its extended, valve opening position, and showing stored gas flowing from the pressure vessel to and through the outlet fitting to discharge orifices in the outlet fitting;

FIG. 6 is an enlarged scale fragmentary sectional view showing the construction and arrangement of the torsion spring for the cocking arm that is a part of the release mechanism shown by FIGS. 4 and 5, the section being taken substantially along line 6—6 of FIG. 7;

FIG. 7 is a sectional view taken substantially along line 7—7 of FIG. 6;

BEST MODE FOR CARRYING OUT THE INVENTION

Figure 1:
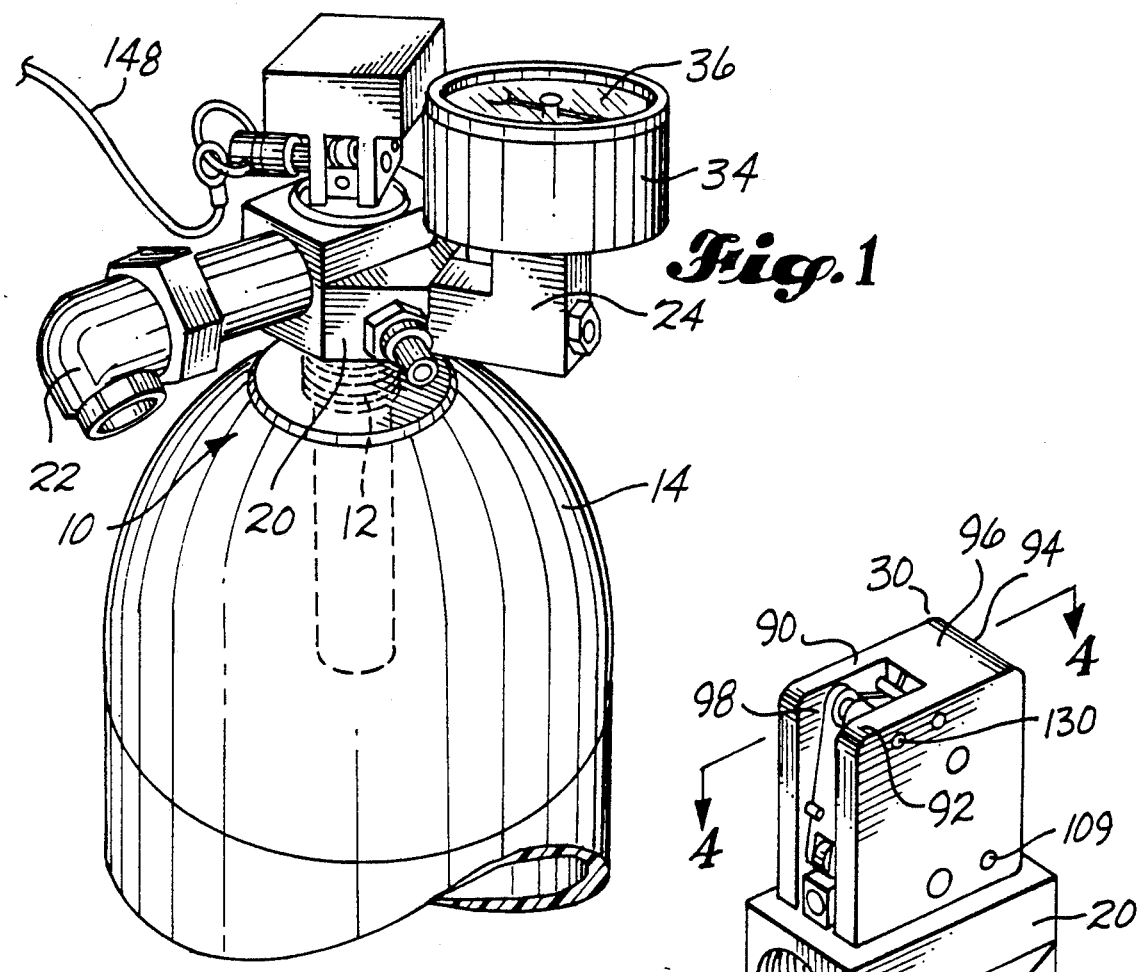
FIG. 1 is a fragmentary pictorial view of an inflation gas storing pressure vessel, showing an assembly of components at the outlet end of the pressure vessel, including a release mechanism which includes the present invention.
Figure 2:
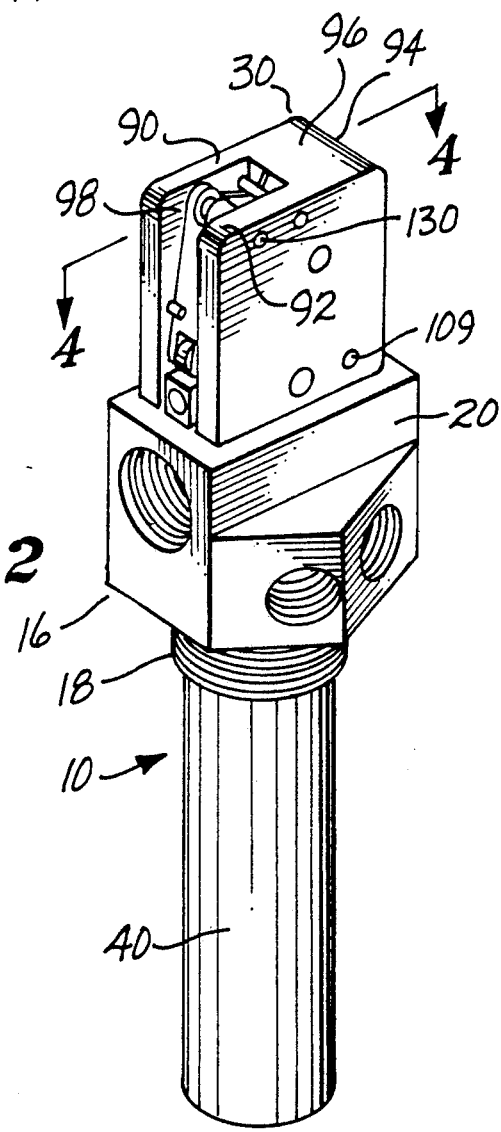
FIG. 2 is an enlarged scale pictorial view of an outlet fitting which is connected to the pressure vessel, showing the release mechanism mounted on top of the fitting.

Referring to FIG. 1 of the drawing, an inflation gas control mechanism 10 is shown connected to the outlet opening 12 of a pressure vessel 14. In the preferred embodiment, pressure vessel 14 holds a liquified gas which when released is used to inflate an inflatable (not shown). Assembly 10 includes a valve and an embodiment of the release mechanism of the present invention. Assembly 10 includes a housing 16 having a threaded neck portion 18 which screws into internal threads within the outlet opening 12 (FIG. 4). Housing 16 also includes a head portion 20 above neck portion 18. Head portion 20 serves as a support for a number of components, including the releasable lock mechanism. Herein the "releasable lock mechanism" is sometimes simply referred to as the "release mechanism".

Figure 3:
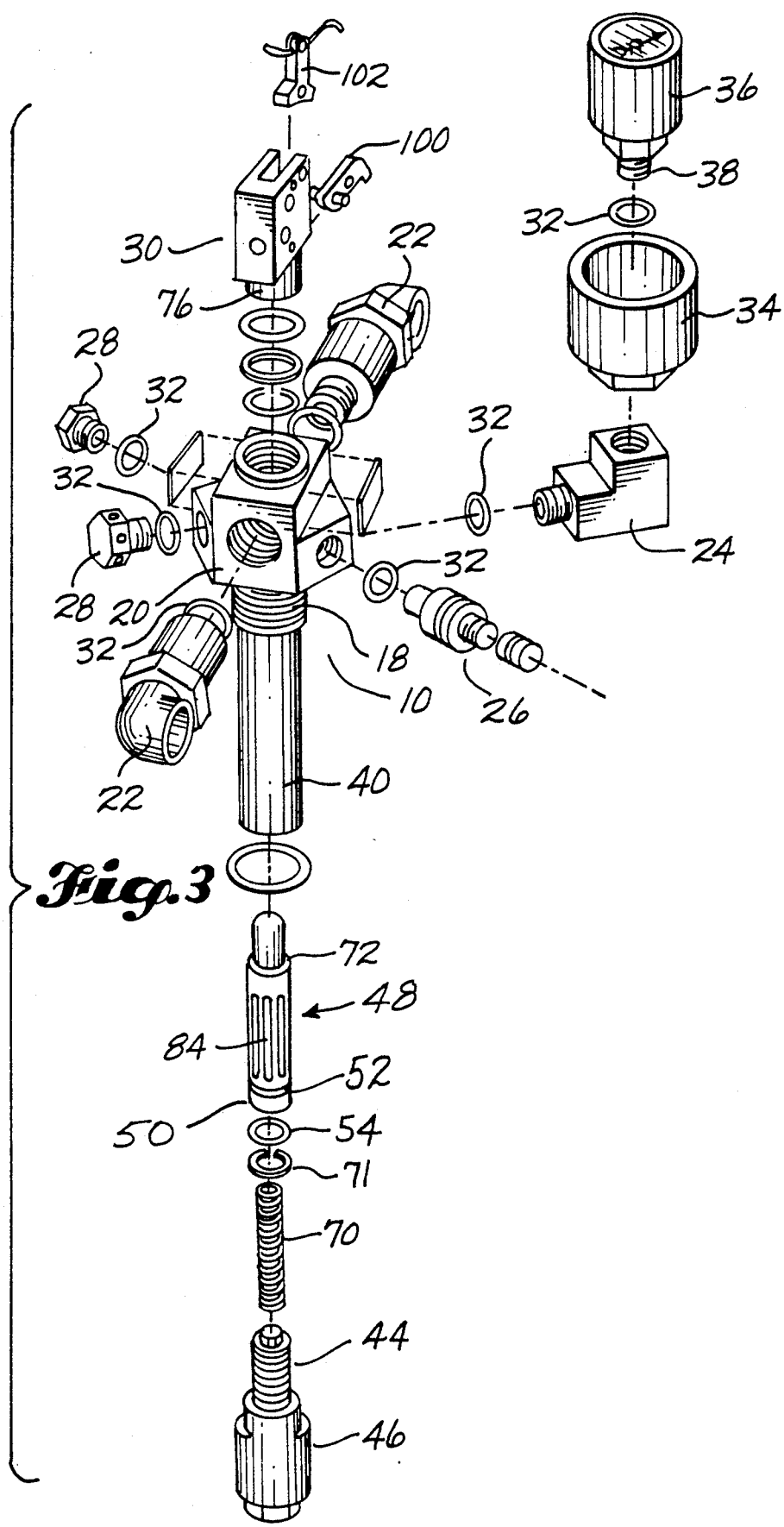
FIG. 3 is an exploded pictorial view of the assembly shown by FIG. 1, but with the upper portion of the pressure vessel omitted.
Figure 8:
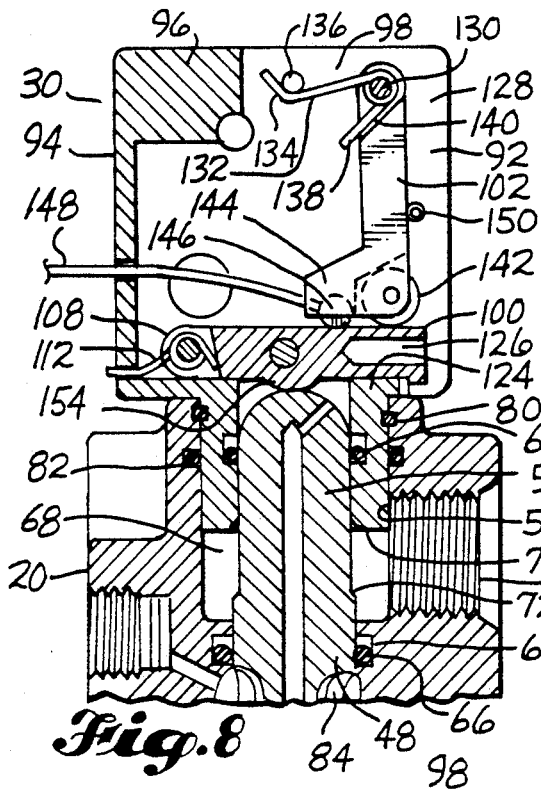
FIG. 8 is a view like FIG. 5, of a modified form of release mechanism, showing the valve plug in its retracted position and the cocking arm and the lock lever positioned to hold the valve plug in its retracted position.
Figure 9:
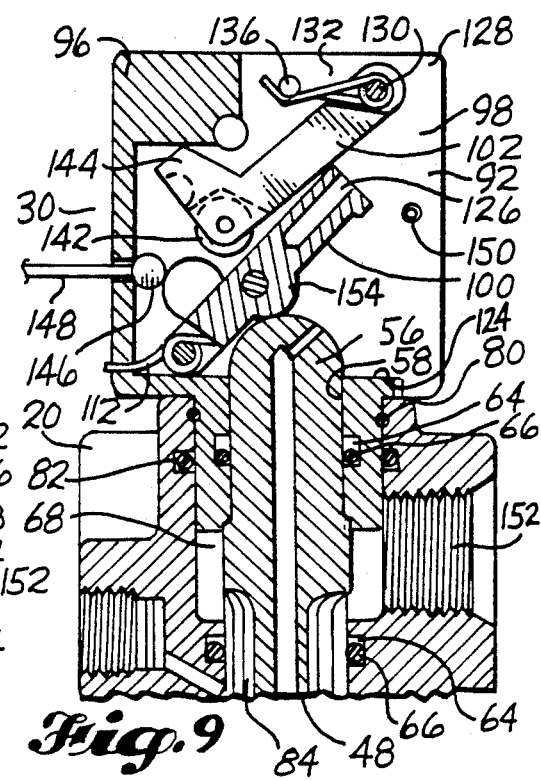
FIG. 9 is a view like FIG. 8, but showing the lock lever in its release position, the cocking arm in its up position and the valve plug in its extended position.
Figure 10:
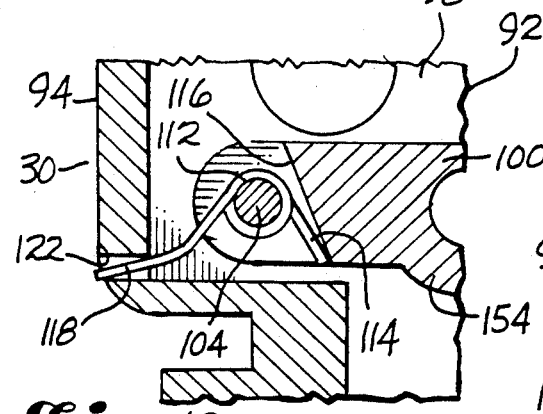
FIG. 10 is a view like FIG. 6, showing the construction and arrangement of the torsion spring for the cocking arm that are a part of the release mechanism shown by FIGS. 8 and 9.
Figure 11:
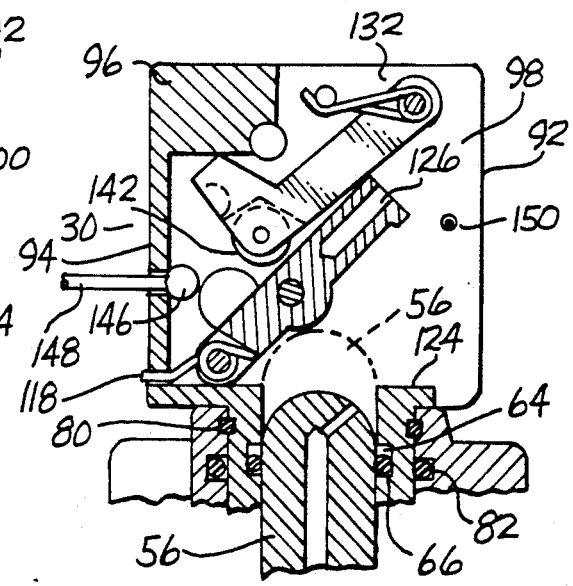
FIG. 11 is a view like FIGS. 5 and 9, but of a third embodiment of the release mechanism.

Referring to FIG. 3, in a typical installation, the components which are mounted on the head portion 20 include outlet fittings 22, a pressure gauge mounting elbow 24, a pressure sensor 26, closure plugs 28, and the release mechanism 30. As illustrated, each of these components includes a threaded nipple and an O-ring seal 32 which fits on the nipple. Each nipple is screwed into a threaded opening in the head portion 20. In the illustrated embodiment, a protective housing 34 for a pressure gauge 36 is secured to elbow 24. The pressure gauge 36 includes a threaded nipple at its lower end which threads into an opening in an upper portion of the elbow 24. Housing 16 also includes an elongated tubular portion 40 which is connected to, and depends from, neck 18. Tubular portion 40 is open at its lower end and includes internal threads 42. Threads 42 mate with threads 44 on a closure plug 46.

As best shown by FIGS. 3 and 4, an elongated valve plug 48 positioned with valve housing 16. Valve plug 48 includes a piston head 50 at its lower end located within housing part 40. An annular groove 52 surrounds piston head 50. An O-ring seal 54 is received within groove 52. Seal 54 seals between the piston part 50 and the interior surface of housing part 40. The upper end portion 56 of valve plug 48 is located within a cylindrical valve plug chamber 58 within head portion 20. Chamber 58 includes an annular groove 60 which surrounds valve plug part 56. An O-ring seal 62 is located within groove 60. The valve plug part 56 extends through the center of the O-ring seal 62. Head portion 20 includes a second annular groove 64 which is spaced axially downwardly from groove 60. An O-ring seal 66 is located within groove 64. Valve plug part 56 extends through the center of O-ring seal 66. O-ring seals 62, 66 seal against gas leakage out from chamber 68.

Valve plug 48 has two positions. These are (1) an extended, valve opening position, and (2) a retracted, valve closing position. The retracted position is illustrated in FIG. 4. The extended position is illustrated in FIG. 5.

An elongated compression spring 70 is located within housing part 40, between piston head 50 and a washer 71 at the upper end portion of closure plug 46. Spring 70 exerts an upwardly directed endwise force on valve plug 48. Thus, spring 70 biases the valve plug 48 into its extended position. When valve plug 48 is in its extended position, a shoulder 72 on valve plug 48 makes abutting contact with an end surface 74 which forms the upper boundary of chamber 68. Surface 74 is an end surface of a tubular lower portion 76 of a release mechanism housing 78. Tubular portion 76 fits down into a central opening formed in head portion 20 of housing 16. O-ring seals 80, 82 are provided to seal against leakage between tubular portion 76 and the sidewall of the opening in which it is received.

Valve plug 48 includes a grooved portion 84 which is in communication with the interior 86 of vessel 14 via ports 88. When valve plug 48 is in its retracted position (FIG. 4), the engagement of plug part 56 with O-ring seal 66 prevents the flow of stored gas out from chamber 86 and into chamber 68. When the valve plug 48 is in its extended position (FIG. 5), the longitudinal grooves in portion 84 of the valve plug 48 communicates at their lower end with chamber 86 (via port(s) 88) and at their upper ends with chamber 68 (FIG. 5). The release mechanism unlocks the valve plug 48, allowing it to move from its closed (retracted) position to its open (extended) position, to cause a release of inflation gas from chamber 86 into chamber 68 and out from chamber 68 to a utilization device, e.g. an inflatable.

In preferred form, the housing 30 includes a pair of sidewalls 90, 92, an end wall 94 and a partial top wall 96. A space or chamber 98 is defined by and between the sidewalls 90, 92. Positioned within chamber 98 are a cocking arm 100 and a lock lever 102. Cocking arm 100 is pivotally connected at one end to the sidewalls 90, 92. In the illustrated embodiment, the pivotal connection is provided by a pivot pin 104 which extends between the sidewalls 90, 92 and through an end portion of the cocking arm 100. The end portion of the cocking arm 100 includes a central slot 106, flanked by ears 108, 110 (FIG. 7). A coil portion of a torsion spring 112 surrounds pin 104 between the ears 108, 110. A first end portion 114 of spring 112 extends at a tangent from pin 104 and contacts an abutment surface 116 at the base of the slot (FIG. 6). A second end portion 118 of spring 112 extends at a tangent from pin 104 towards a lower corner region of the housing 30. As shown by FIG. 6, the second end portion may extend below a cross pin 120. Or, it may extend through an opening 122 in end wall 94, as shown by FIGS. 8-11. The pin 120, or the hole 122, provides an anchor for the spring end portion 118. The opposite end portion 114 of spring 112 exerts a force on surface 116 which wants to rotate the arm 100 into the position shown by FIGS. 5, 9, and 11. A rotation of cocking arm 100 downwardly, into the position shown by FIGS. 4, 6, 8, and 10, will store energy in spring 112.

As clearly shown by FIGS. 4-11, the pivot pin 104 is positioned on one side of the tubular chamber 58 in which end portion 56 of valve plug 48 is situated. When cocking arm 100 is in the position shown by FIGS. 4, 6, 8 and 10, it spans across the upper end of the tubular chamber 58. Its free end rests on surface 124 which is a part of the base wall of housing 30. The free end of cocking arm 100 includes an axial socket 126 into which a cocking tool is inserted, as will be described in more detail below. When cocking arm 100 is in its up position, it is positioned upwardly away from its down position a sufficient distance to allow valve plug 48 to move from its retracted position into its extended position.

The lock lever 102 includes an upper end portion 128 which is very similar in construction to the connected end portion of cocking arm 100. Look lever 102 is pivotally connected to housing 30 by means of a pivot pin 130 which extends across cavity 98, between sidewalls 90, 92. A coil spring 132 surrounds pin 130, within a slot formed in the upper end portion of lock lever 102. A first end 134 of spring 132 contacts an abutment pin 136. An opposite end portion 138 of spring 132 contacts a sloping surface 140 which forms the base of the spring slot. Spring 132 normally biases lock arm 102 towards the position shown by FIGS. 4 and 8. In preferred form, lock arm 102 carries a roller 142 at its free end. This roller 142 makes rolling contact with the cocking arm 100. Lock lever 102 also includes a hook 144 which is spaced from roller 142. Hook 144 receives a ball 146 which is at the end of a release line 148. When the lock 102 is in the position shown by FIGS. 4 and 8, the ball is within a hook throat. A stop pin 150 extends between walls 90, 92, near the open side of chamber 98, opposite wall 94. As previously stated, spring 132 biases lock arm 102 into the position shown by FIGS. 4 and 8. It actually biases lock arm 102 against stop pin 150. When lock arm 102 is against stop pin 150, roller 152 makes contact with cocking arm 100 at a location offset outwardly from a vertical position of arm 102. Thus, any upward force acting on roller 142 would want to swing lock arm 102 towards pin 150, rather than away from it. As will be readily appreciated from an inspection of the drawing figures, when lock lever 102 is in the position shown by FIGS. 4 and 8, the cocking arm 100 is in its down position and it is held in its down position by the lock arm 102.

The releasable lock mechanism is set in the following manner. The ball 146 on line 148 is positioned in the hook 144. A lever bar is inserted into socket 124 in the end of cocking arm 100. The lever bar is moved downwardly to swing the cocking arm 100 into its down position. When this happens, spring 132 urges the lock lever 102 into its lock position, shown by FIGS. 4 and 8. Movement of lock lever 102 into this position may be assisted by use of a tool applied against lock arm 102. Cocking arm 100, when in its down position, spans across the tubular chamber 58, in contact with the upper end portion 56 of valve plug 48. Look lever 102 extends downwardly into contact (at wheel 142) with cocking arm 100, so as to hold the cocking arm 100 in its down position. The downward movement of cocking arm 100 exerts a downward force on valve plug 48, moving the valve plug 48 downwardly from its extended position into its retracted position. This downward movement of valve plug 48 compresses spring 70, thus storing energy in spring 70.

Control line 148 may include a handle (not shown) at its end opposite ball 146. When it is desired to release stored gas from vessel 14, an operator merely grabs the handle on line 148 (or line 148) and gives a sharp pull on line 148. This pull moves ball 146 against hook portion 144 and swings the lock arm 102 away from pin 150, in the direction of the pull. The pull on lock lever 102 is sufficient to move lock arm 102 first along cocking arm 100 and then lift it up from cocking arm 100. In response, spring 112 overrides spring 132 and moves the cocking arm 100 and the lock lever 102 into the position shown by FIGS. 5, 9, and 11. Spring 112 may be made stronger than spring 132 by constructing it to include a larger number of turns, or by using stronger spring wire, or by doing both.

Movement of cocking arm 100 into its up position removes it from a position blocking extension of valve plug 48. This allows spring 70 to function and move the valve plug 48 endwise outwardly, moving valve plug 48 from its retracted position into its extended position. In response, stored gas within chamber 86 flows through the grooves 84 into chamber 68 and from chamber 68 out through outlet passageway 152, to the utilization device (not shown).

In accordance with an aspect of the invention, the cocking arm 100 may be formed to include a protuberance 154 which faces towards the end chamber 58. Thus, when cocking arm 100 is in its down position, the protuberance 154 extends downwardly into chamber 58 and contacts the outer end of valve plug 48. As will readily be seen from FIGS. 4 and 8, the protuberance 154 serves to depress the valve plug 48 a greater amount than would be the case if the protuberance 154 were to be omitted. The increased depression of valve plug 48 causes a greater compression of spring 70. Thus, the presence of protuberance 154 on cocking arm 100 acts to increase the amount of stored energy placed into spring 70 when the cocking arm 100 is moved into its down position. In some installations it may not be necessary to use the protuberance 154. In such case, the protuberance 154 can be omitted from cocking arm 100 (see FIG. 11).

The illustrated embodiments are presented by way of example. They are not to be used to limit the scope of protection. Rather, the scope of protection is to be determined by the claims which follow, interpreted by use of the rules of patent claim interpretation, including use of the doctrine of equivalents.

What is claimed is:

1. In a mechanism for releasing stored gas from a pressure vessel by moving a lock lever from a lock position into a release position, wherein when the lock lever is in its lock position it contacts a cocking arm and locks the cocking arm in a down position against the outer end of a reciprocating valve plug which is in a retracted position, and wherein when the lock lever is in its release position it is spaced from the cocking arm and the cocking arm is free to move up from its down position to an up position, allowing a valve plug spring which acts on the valve plug to move the valve plug endwise outwardly from its retracted position into an extended position, the improvement characterized by:

a cocking arm spring connected to the cocking arm and positioned to bias the cocking arm into its up position, said cocking arm spring functioning to immediately move the cocking arm from its down position to it sup position in response to movement of the lock lever from its lock position to its release position, and to hold the cocking arm in its up position and also hold the lock lever in its release position, so as to prevent movement of the lock lever back into said lock position before the valve plug spring operates to extend the valve plug from its retracted position into its extended position;

a support structure for the lock lever;

wherein the cocking arm is positioned axially outwardly of a tubular chamber in which the valve plug is housed, said tubular chamber having an outer end against which the cocking arm rests when the cocking arm is in its down position against the valve plug, and the valve plug is retracted, and the locking lever is in its lock position; and said improvement being further characterized by a lateral protuberance on the cocking arm, extending axially downwardly into the valve plug chamber, said protuberance contacting the outer end of the valve plug and functioning to move the valve plug an additional amount against the valve plug spring, so as to increase the stored energy in the valve plug spring available for moving the valve plug from its retracted position into its extended position.

2. In a mechanism for releasing stored gas from a pressure vessel by moving a lock lever from a lock position into a release position, wherein when the lock lever is in its lock position it contacts a cocking arm and locks the cocking arm in a down position against the outer end of a reciprocating valve plug which is in a retracted position, and wherein when the lock lever is in its release position it is spaced from the cocking arm and the cocking arm is free to move up from its down position to an up position, allowing a valve plug spring which acts on the valve plug to move the valve plug endwise outwardly from its retracted position into an extended position, the improvement characterized by:

a cocking arm spring connected to the cocking arm and positioned to bias the cocking arm into its up position, said cocking arm spring functioning to immediately move the cocking arm from its down position to its up position in response to movement of the lock lever from its lock position to its release position, and to hold the cocking arm in its up position and also hold the lock lever in its release position, so as to prevent movement of the lock lever back into said lock position before the valve plug spring operates to extend the valve plug from its retracted position into its extended position;

a support structure for the lock lever and the cocking arm, and a pivot pin connecting an end portion of the cocking arm to the support structure, for pivotal movement of the cocking arm about the pivot pin;

wherein said improvement is further characterized by said cocking arm spring being a torsion spring having a helical portion surrounding the pivot pin, a first end portion anchored to the support structure, and a second end portion in contact with the cocking arm;

wherein movement of the cocking arm from its up position into its down position, to move the valve plug from its extended position into its retract position, stores energy in the torsion spring;

wherein the support structure for the lock lever and the cocking arm is positioned axially outwardly of a tubular chamber in which the valve plug is housed, said tubular chamber having an outer end against which the cocking arm rests when the cocking arm is in its down position against the valve plug, and the valve plug is retracted, and the lock lever is in its lock position; and said improvement being further characterized by a lateral protuberance on the cocking arm, extending axially downwardly into the valve plug chamber, said protuberance contacting the outer end of the valve plug and functioning to move the valve plug an additional amount against the valve plug spring, so as to increase the stored energy in the valve plug spring available for moving the valve plug from its retracted position into its extended position.

3. In a mechanism for releasing stored gas from a pressure vessel by moving a lock lever from a lock position into a release position, wherein when the lock lever is in its lock position it contacts a cocking arm and locks the cocking arm in a down position against the outer end of a reciprocating valve plug which is in a retracted position, and wherein when the lock lever is in its release position it is spaced from the cocking arm and the cocking arm is free to move up from its down position to an up position, allowing a valve plug spring which acts on the valve plug to move the valve plug endwise outwardly from its retracted position into an extended position, the improvement characterized by:

a cocking arm spring connected to the cocking arm and positioned to bias the cocking arm into its up position, said cocking arm spring functioning to immediately move the cocking arm from its down position to its up position in response to movement of the lock lever from its lock position to its release position, and to hold the cocking arm in its up position and also hold the lever lock in its release position, so as to prevent movement of the lock lever back into said lock position before the valve plug spring operates to extend the valve plug from its retracted position into its extended position;

a support structure for the lock lever and the cocking arm, and a pivot pin connecting an end portion of the cocking arm to the support structure, for pivotal movement of the cocking arm about the pivot pin;

wherein said improvement is further characterized by said cocking arm spring being a torsion spring having a helical portion surrounding the pivot pin, a first end portion anchored to the support structure, and a second end portion in contact with the cocking arm;

wherein movement of the cocking arm from its up position into its down position, to move the valve plug from its extended position into its retract position, stores energy in the torsion spring;

wherein the support structure for the lock lever and the cocking arm is positioned axially outwardly of a tubular chamber in which the valve plug is housed, said tubular chamber having an outer end against which the cocking arm rests when the cocking arm is in its down position against the valve plug, and the valve plug is retracted, and the lock lever is in its lock position; and said improvement being further characterized by a lateral protuberance on the cocking arm, extending axially downwardly into the valve plug chamber, said protuberance contacting the outer end of the valve plug and functioning to move the valve plug an additional amount against the valve plug spring, so as to increase the stored energy in the valve plug spring available for moving the valve plug from its retracted position into its extended position.

* * * * *